United States Patent [19]
Bobel

[11] Patent Number: 5,150,013
[45] Date of Patent: Sep. 22, 1992

[54] POWER CONVERTER EMPLOYING A MULTIVIBRATOR-INVERTER

[75] Inventor: Andrzej Bobel, Des Plaines, Ill.

[73] Assignee: Motorola, Inc., Schaumburg, Ill.

[21] Appl. No.: 696,422

[22] Filed: May 6, 1991

[51] Int. Cl.$^5$ .............................................. H05B 37/00
[52] U.S. Cl. ........................ 315/209 R; 315/209 CD; 315/224; 315/226; 315/DIG. 7
[58] Field of Search ........ 315/209 R, 209 T, 209 CD, 315/219, 226, 224, DIG. 5, DIG. 7; 331/113 R

[56] References Cited

U.S. PATENT DOCUMENTS

| | | | |
|---|---|---|---|
| 4,572,989 | 2/1986 | Zuchtriegel | 315/209 T X |
| 4,709,189 | 11/1987 | Kuchii | 315/209 R |
| 4,782,268 | 11/1988 | Fähnrich et al. | 315/209 R X |
| 4,959,591 | 9/1990 | Hirschmann | 315/209 R |
| 5,309,919 | 8/1991 | Nilssen | 315/209 R |

Primary Examiner—Robert J. Pascal
Attorney, Agent, or Firm—Peter Hudson

[57] ABSTRACT

A high efficiency, self-oscillating LC resonant multivibrator-inverter circuit employing a pair of switching transistor (Q1, Q2), two magnetically independent resonant inductors (L1, L2) and one common resonant capacitor (CR). Two secondary windings (NB2, NB1) of the resonant inductors provide feedback control for the switching transistors' bases, to provide intermittent feedback current to effect alternate and periodic conduction of the transistors. This results in the DC voltage rectified from the source S being converted to relatively high frequency AC voltage across output terminals (O1, O2). Such an arrangement enables construction of a cost effective, highly efficient, and highly reliable electronic ballast for fluorescent lamps.

19 Claims, 3 Drawing Sheets

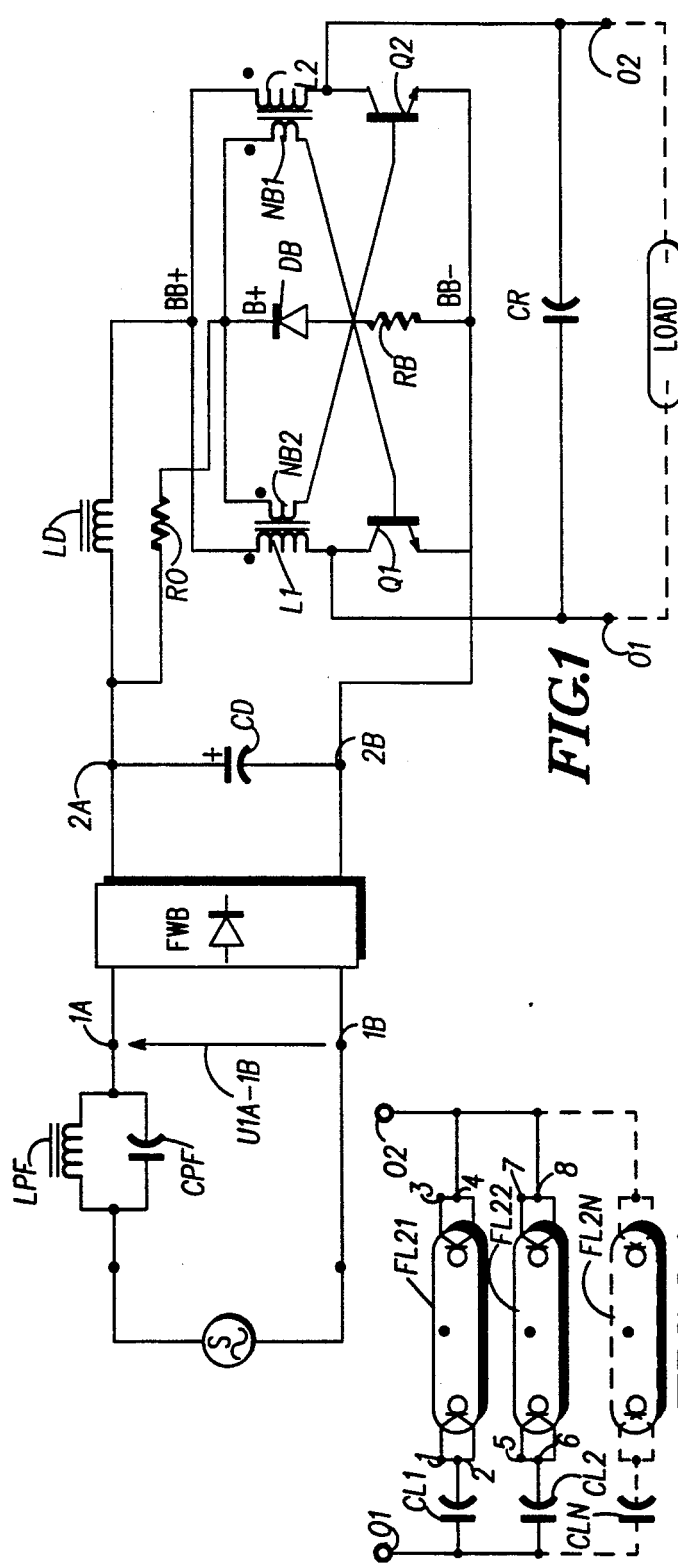
*FIG.1*
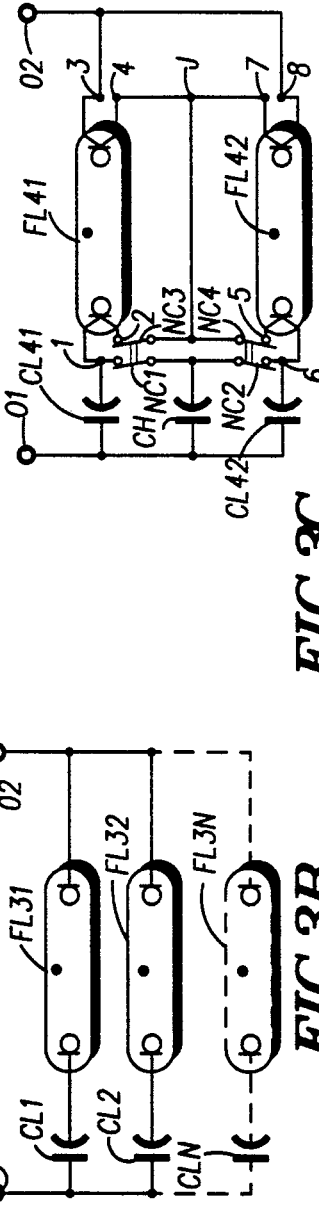
*FIG.3C*
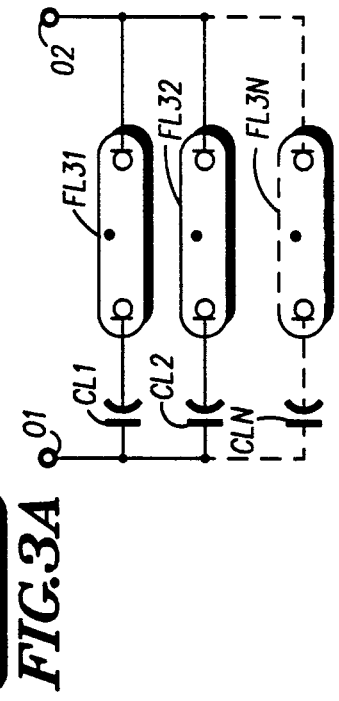
*FIG.3B*
*FIG.3A*

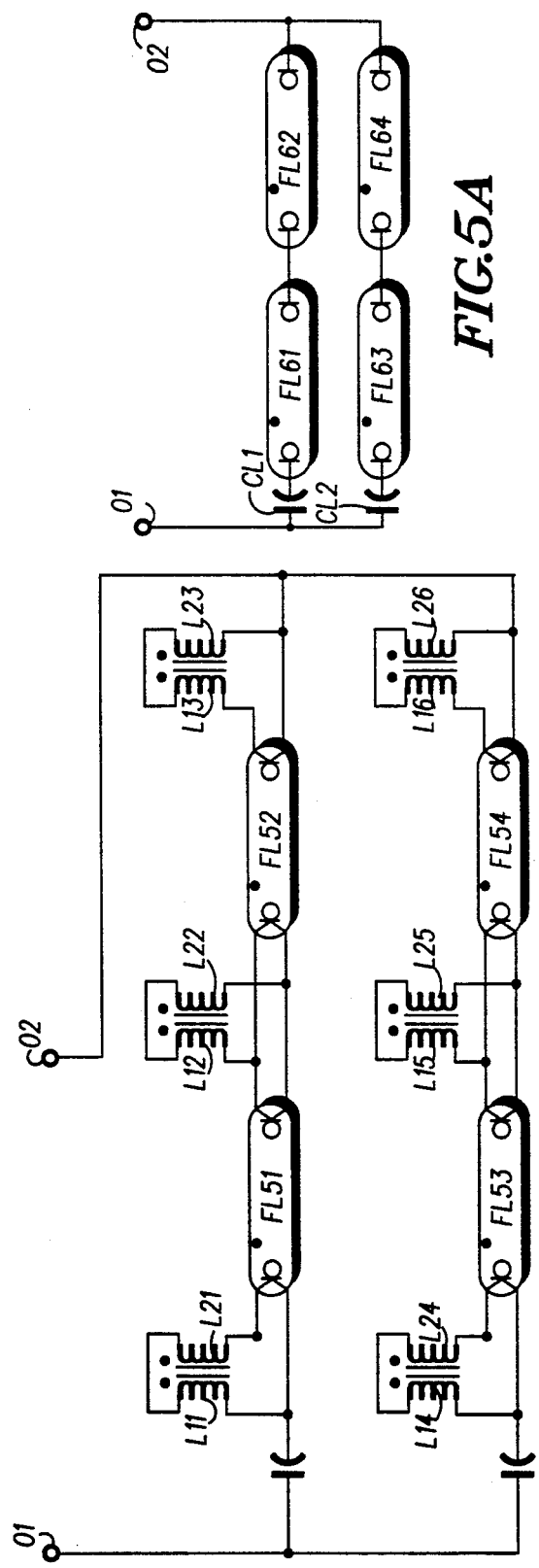
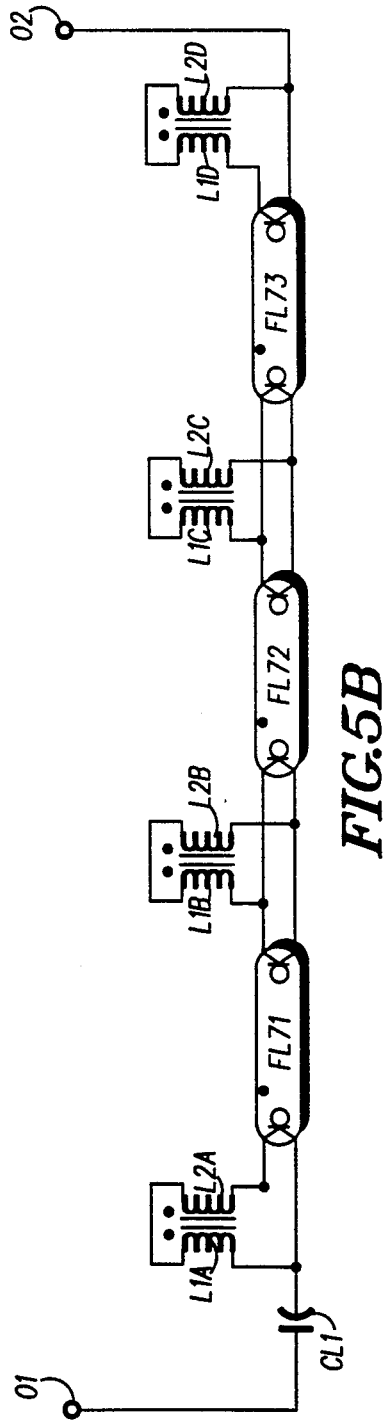
FIG.5A
FIG.4
FIG.5B

POWER CONVERTER EMPLOYING A MULTIVIBRATOR-INVERTER

BACKGROUND OF THE INVENTION

1. Field of the Invention

The present invention relates in general to electrical energy conversion devices and more particularly to electronic inverters adapted to convert a DC voltage to an AC voltage. Such inverters are typically used in ballasts to energize fluorescent lamps or any other loads from ordinary electric utility power lines.

2. Discussion of the Prior Art

Power-line-operable electronic inverter-type ballasts having parallel-resonant or series resonant circuitry are well known. As is known in the art, inverter circuits are employed to convert a DC input voltage into an AC output voltage. It is also known that resonant oscillators are useful energy conversion devices because of their relatively high efficiencies. However, this applicant is not aware of any prior art relevant to self-oscillating LC resonant multivibrator-inverters to achieve high-reliability high-efficiency DC to AC energy conversion.

SUMMARY OF THE INVENTION

In a preferred embodiment the present invention provides a relatively simple, cost-effective, highly reliable and highly efficient electronic inverter, which can be easily constructed to all varieties of loads and power level requirements.

In a preferred embodiment, subject invention provides a relatively simple, cost-effective, highly reliable electronic ballast for gas discharge lamps without any restrictions on its power or starting and working voltage.

In a preferred embodiment, the present invention provides an improved multivibrator-inverter circuit in which energy loss due to transistor common mode conduction is eliminated.

In a preferred embodiment, subject invention provides an improved inverter circuit in which switching transistor feedback is employed to minimize the switching transistor energy loss during turn-off transition.

In a preferred embodiment, the present invention provides an improved transistor switching circuit to minimize power dissipation as a result of turning on the transistor before its collector voltage has been reduced to its minimum level.

In a preferred embodiment, subject invention provides an improved inverter circuit in which an efficient base drive circuit is provided to minimize power dissipation within each transistor while it is in conduction mode.

In a preferred embodiment, present invention comprises an LC resonant multivibrator-inverter type circuit made of two switching transistors, two inductors and one resonating capacitor, and powered from a DC voltage source. Said DC voltage is supplied through a current-limiting inductor. The resonant inductors and resonant capacitor are connected in such a way that secondary windings of said inductors provide intermittent feedback current to effect periodic conduction of two transistors. At the moment when the first transistor begins to conduct, the energy storing capacitor interacts with the first inductor by way of natural resonance and periodic energy transfer occurs. The voltage across the capacitor is a sinusoidal half-wave. The time-length of the half-wave depends on the natural resonant frequency of the first inductor and the capacitor. At the end of this time period, when the capacitor is discharged, the second transistor begins its conductive stage. The periodic energy transfer occurs again but this time the second inductor interacts with the capacitor by way of natural resonance thereby charging the capacitor with reverse polarity in comparison to the previous period. The voltage developed across the capacitor is again a sinusoidal half-wave whose time-length depends on the natural resonant frequency of the second inductor and the capacitor. In both periods of time energy transfer from the resonant capacitor to either inductor provides reset (reverse) current to the bases of the switching transistors thereby controlling the ON-time of each transistor. Natural (resonant) energy transfer in this way between two magnetically independent tank-inductors and one tank-capacitor produces a near-perfectly sinusoidal voltage across terminals of the capacitor.

In a preferred embodiment, subject invention provides triggering of the multivibrator by bleeding of a few milliamps to tickle the bases of the transistors, and by strong positive feedback causing deeper saturation of the transistors with every next resonant oscillation stage, until complete saturation of both transistors occurs in a very short time.

In a preferred embodiment, subject invention provides two magnetically independent inductors resonating alternately with a tank capacitor. Such a combination has an effect on overall efficiency of the multivibrator-inverter circuit. In practical design, the RMS voltage across each inductor is half in value in comparison with the RMS voltage across the resonating capacitor. Smaller voltage across a ferromagnetic core inductor produces smaller flux density, which in effect appears as smaller core losses in the form of heat. In result, the inverter will operate with higher efficiency.

In a preferred embodiment, subject invention provides an electronic multivibrating LC resonant inverter circuit which will stop operation without damage in case of overload or short circuit between its output terminals due to its foldback nature. The inverter circuit will cease its oscillations in case of an overload or will not be triggered to oscillate if there is a short circuit between any of its output terminals.

These and other advantages will become apparent from the following description which, when taken in conjunction with the accompanying drawings, discloses a preferred embodiment of the invention.

BRIEF DESCRIPTION OF THE DRAWINGS

FIG. 1 shows a schematic diagram of a multivibrator-inverter ballast circuit incorporating the invention;

FIG. 3a, FIG. 3b and FIG. 3c show various alternative load arrangements for the circuit of FIG. 2, associated with a variety of ballasts types and lamp types;

FIG. 4 shows alternative isolated output load arrangements for the circuit of FIG. 2, with four rapid start lamps; and FIG. 5a, FIG. 5b show two alternative load arrangements for the circuit of FIG. 2, associated with various fluorescent lamps.

DESCRIPTION OF THE PREFERRED EMBODIMENT

1. Details of Construction

Figure 2:
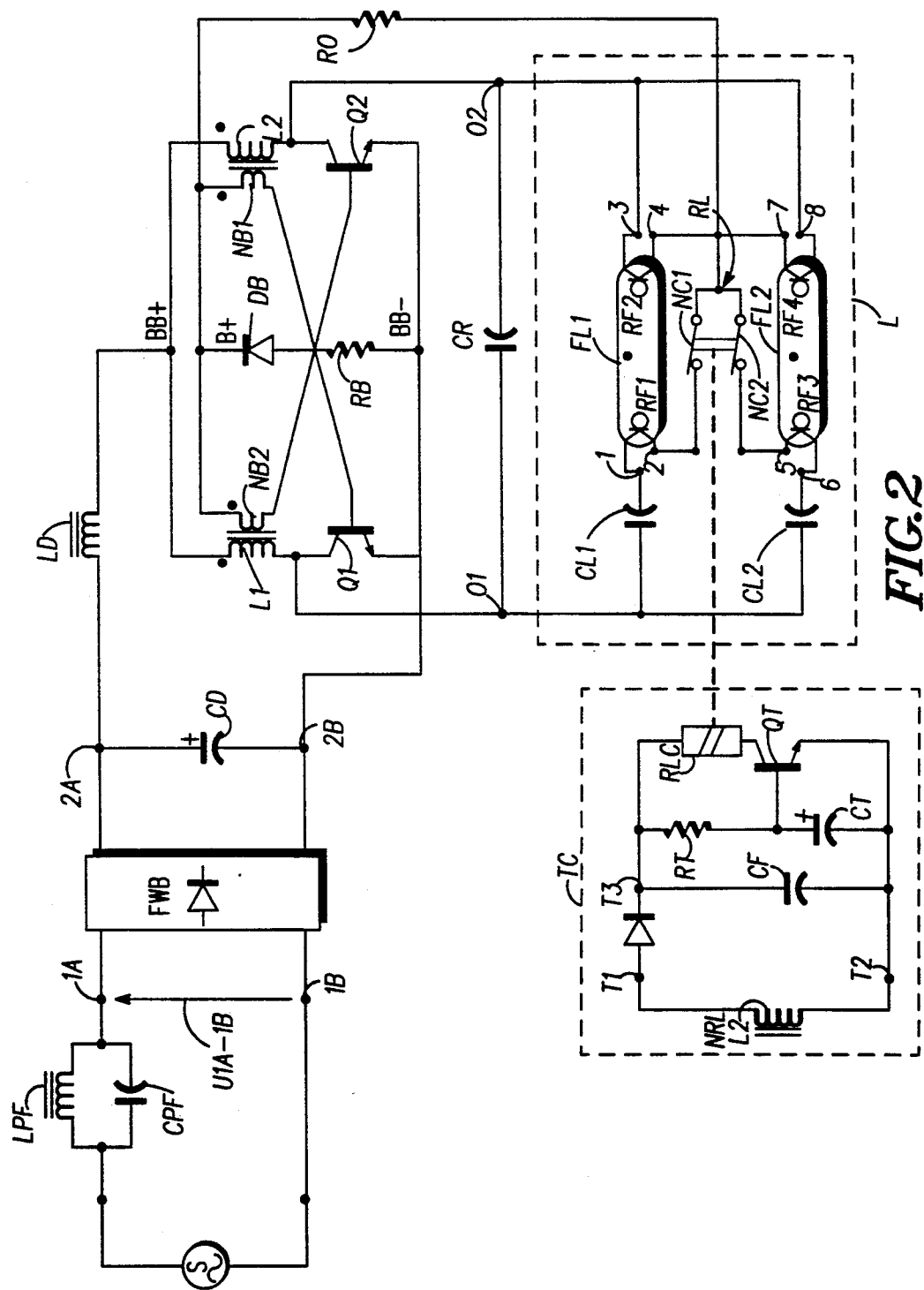
FIG. 2 shows a schematic diagram of a variant of the multivibrator-inverter ballast circuit incorporating a particular load arrangement.

In FIG. 1 a full-wave bridge rectifier FWB is connected to a source of AC voltage S through an LC circuit which is parallel resonant at 180 Hz which consists of an inductor LPF and capacitor CPF. The DC voltage output from the bridge FWB, filtered by a capacitor CD which is relatively small in value, is applied to a BB+ bus and BB− bus through current limiting inductor LD. The LC resonant multivibrator-inverter comprises two magnetically independent inductors L1 and L2 (nominally identical in value). First terminals of both inductors are connected to the BB+ bus. The collector of a transistor Q1 is connected to a second terminal of the inductor L1. The collector of a transistor Q2 is connected to a second terminal of the inductor L2. Emitters of the transistors Q1 and Q2 are connected to the BB− bus. A resonating tank capacitor CR is connected between output terminals O1 and O2. The load is connected to terminals O1 and O2.

The multivibrator is made to self-oscillate through positive feedback provided to the two transistors' bases by way of secondary windings NB1 and NB2 of the inductors L2 and L1 respectively in conjunction with switching diode DB and current-limiting resistor RB. First terminals of the secondary windings NB1 and NB2 are connected to a terminal B+; a second terminal of the winding NB1 is connected to the base of the transistor Q1, and a second terminal of the winding NB2 is connected to the base of the transistor Q2. The anode of the switching diode DB is connected to the terminal B+, the cathode of the switching diode is connected through the resistor RB to the BB− bus. The multivibrator is triggered into self-oscillation by bleeding of a few milliamps to tickle the transistor bases through resistor R0 connected between terminals 2A and B+.

Referring now also to FIG. 2, in a particular load arrangement L a capacitor CL1 is connected between output terminal O1 and terminal 1 of a lamp FL1. Normally closed contact NC1 of a micro relay RL is connected between terminals 2 and 4 of the lamp FL1. Terminal 3 of the lamp FL1 is connected to terminal O2. A capacitor CL2 is connected between output terminal O1 and terminal 6 of a lamp FL2; normally closed contact NC2 of the micro relay RL is connected between terminals 5 and 7 of the lamp FL2; terminal 8 of the lamp FL2 is connected to output terminal O2.

In a timing circuit TC a secondary winding NRL of the inductor L2 is the source of voltage for the timing circuit. The cathode of a rectifier diode DT is connected to terminal T1 of the winding NRL. A filtering capacitor CF is connected between terminals T3 and T2. A timing resistor RT is connected between terminal T3 and the base of a transistor QT. A timing capacitor CT is connected between terminal T2 and the base of the transistor QT. The emitter of the transistor QT is connected to terminal T2. The coil RLC of the micro relay RL is connected between terminal T3 and the collector of the transistor QT.

In the load arrangement of FIG. 3a two fluorescent lamps FL21 and FL22 known as bi-pin have both filament terminals shorted. A current limiting capacitor CL1 is connected in series with the lamp FL21. A current limiting capacitor CL2 is connected in series with the lamp FL22. Possible multiple lamp load configuration is shown by the broken-line parallel connection of series-combination of capacitor CLN and lamp FL2N connected across output terminals O1 and O2.

In the load arrangement of FIG. 3b two instant start fluorescent lamps FL31 and FL32 are connected each in series with current limiting capacitors CL1 and CL2 respectively. Possible multiple lamp load configuration is shown by the broken-line connection of series-combination of lamp FL3N and capacitor CLN connected across terminals O1 and O2.

In the load arrangement of FIG. 3c four normally closed contacts NC1, NC2, NC3 and NC4 of a micro relay are used to pre-condition two bi-pin fluorescent lamps FL41 and FL42 before the lamps start. Capacitors CL41, CL42, and CH are connected to output terminal O1. The capacitor CL41 is connected to terminal 1 of the lamp FL41. The capacitor CL42 is connected to terminal 6 of the lamp FL42. The contacts NC1 and NC2 are connected in such a way that the capacitor CH is connected in parallel to capacitors CL41 and CL42 for the preconditioning time period. The contact NC3 is connected between terminals 2 and 4 of the lamp FL41. The contact NC4 is connected between terminals 5 and 7 of the lamp FL42. Terminal 3 of the lamp FL41 and terminal 8 of the lamp FL42 are connected to output terminal O2.

2. Description of Operation

The operation of the LC resonant multivibrator-inverter circuit of FIG. 1 may be explained as follows.

Source S provides AC voltage to full-wave bridge rectifier FWB through a power factor correction circuit consisting of parallel connected inductor LPF and capacitor CPF resonating at or near the frequency of 180 Hz which is the third harmonic frequency of the ordinary power line, thereby providing relatively high series impedance for the third harmonic current drawn by the inverter circuit, effectively providing an input voltage U1A-1B waveshape relatively similar to the algebraic sum of the first harmonic of the power line voltage waveshape and its third harmonic waveshape. In effect the rectifier voltage waveshape is very easily filtered of 120 Hz ripple by means of electrolytic capacitor CD which is relatively small in value. A substantially constant DC voltage then results at the terminals BB+ and BB− of multivibrator-inverter, applied by way of current-limiting inductor LD. The LC resonant multivibrator-inverter is tickled into self-oscillation by way of resistor R0, and the multivibrator is made to self-vibrate through positive feedback provided to the two transistor bases by way of secondary windings NB1 and NB2 of the inductors L1 and L2 in conjunction with switching diode DB and current limiting resistor RB. The strong positive feedback causes deeper saturation of the transistors with every next resonant oscillation stage, until complete saturation of both transistors occurs in very short time. At the moment when the first transistor Q1 begins to conduct the capacitor CR interacts with the inductor L1 by way of natural resonance and periodic energy transfer occurs. The voltage across the capacitor is a near-perfectly sinusoidal half-wave. The time-length of the sinusoidal half-wave depends on the natural resonant frequency of the inductor L1 and capacitor CR. At the end of this time period, when the capacitor CR is discharged, the transistor Q1 is in its non-conductive stage and transistor Q2 is in its conductive stage. The periodic energy transfer occurs again but this time inductor L2 interacts with capacitor CR by way of the natural resonance, thereby charging the capacitor with reverse polarity in comparison to the previous period. The voltage developed across the capacitor is again a near-perfectly sinusoidal halfwave whose time-length depends on the natural resonant frequency of the inductor L2 and capacitor CR. In both periods of time energy transfer from the capacitor to the respective inductor provides reverse (reset) current to the respective transistor's base, thereby controlling ON-time of each transistor. Taking into consideration that two inductors L1 and L2 are relatively identical in value, the natural resonant energy transfer between the inductors L1, L2 and capacitor CR results in development of a near-perfectly sinusoidal voltage across terminals of said capacitor. The magnitude of this voltage is independent of the natural frequency of the resonant circuit.

It is important to note that both transistors are switched ON and OFF with great efficiency. The result of this switching performance is that as soon as the resonant capacitor discharges to zero volts, the base drive current reverses, thereby rapidly evacuating the stored charge carriers from the base emitter junctions of transistors. It should be noted that the positive feedback which causes the rapid evacuation of the charge carriers from the base-emitter junction of transistor Q1 prevents any positive voltage transients on the base of the transistor Q2 and vice versa. At the same time, when the voltage across resonant capacitor is zero in magnitude, the secondary windings NB1, NB2 provide effective short circuit between both the transistor bases, thereby keeping both bases at negative potential until one of the transistors begins to conduct. Furthermore, the non-conductive transistor simply cannot be turned on until current has stopped flowing through the opposite transistor. As a result, the transistor Q1 is turned off completely before its collector voltage rises to any significant level. This greatly minimizes power dissipation in the transistor during the turn-off transition. Accordingly, the turn-on losses are eliminated as the off-transistor is not turned on until after its collector voltage has reached zero. This is precisely what is accomplished by the base drive circuit in the operation of the secondary windings NB1 and NB2 in conjunction with diode DB and resistor RB.

Referring now also to FIG. 2, when voltage is present between terminals O1 and O2, current starts flowing through the series connection of capacitor CL1, filament RF1, contact NC1 and filament RF2 thereby pre-conditioning the fluorescent lamp FL1 before it may receive energy. Similar pre-conditioning of the lamp FL2 occurs through capacitor CL2, filament RF3, contact NC2 and filament RF4. The timing circuit TC used to delay powering the coil RLC has a time delay preset to about 2 seconds. Such time delay will adjust itself based on the power line voltage level. When line voltage is lower than nominal, the time of pre-conditioning will become longer; and when power line voltage is higher than nominal, the pre-conditioning time period will become shorter. In all cases the energy received by the lamps filaments will not change, despite the power line voltage changes. When the relay's coil RLC is energized, the contacts NC1 and NC2 become open. The voltage available at terminals O1 and O2 is applied to each lamp through current limiting capacitors CL1 and CL2 thereby igniting said lamps. The energy is not applied to the filaments after the contacts become open, and that feature is important in the matter of energy efficiency.

In the load arrangement illustrated in FIG. 3c, to increase the amount of energy applied to the lamp filaments, the additional parallel capacitor CH is used. This capacitor, connected in parallel with capacitors CL1 and CL2 for the time period which is preset by timing circuit TC, reduces the total reactance and allows more current to flow through the lamp filaments to speed up the pre-conditioning process already described in connection with FIG. 2. It is important to note that the ballast circuit will not operate and will not take any power from the source S if at least one lamp is not placed in its fixture. The resistor R0 becomes disconnected from terminal J if at least one lamp is not located in a fixture.

Referring now to FIG. 4, in an alternative load arrangement, four lamps FL51, FL52, FL53 and FL54 are coupled to the output terminals O1 and O2 of FIG. 1 or FIG. 2 in two parallel paths via respective capacitors. The lamps are coupled to the multivibrator-inverter of FIG. 1 or FIG. 2 by additional secondary windings L11, L12, L13, L14, L15 and L16 wound with the inductor L1 and additional secondary windings L21, L22, L23, L24, L25 and L26 wound with the inductor L2.

Referring now to FIG. 5a, in an alternative load arrangement, four lamps FL61, FL62, FL63 and FL64 are coupled to the output terminals O1 and O2 of FIG. 1 or FIG. 2 in two parallel paths via respective capacitors CL1, CL2.

Referring now to FIG. 5b, in an alternative load arrangement, three lamps FL71, FL72, and FL73 are coupled to the output terminals O1 and O2 of FIG. 1 or FIG. 2 in series via a capacitor CL1. The lamps are coupled to the multivibrator-inverter of FIG. 1 or FIG. 2 by additional secondary windings L1A, L1B, L1C and L1D wound with the inductor L1 and additional secondary windings L2A, L2B, L2C and L2D wound with the inductor L2.

It will thus be appreciated that the described ballast circuit provides a relatively simple, cost-effective, highly reliable and highly efficient electronic inverter, which can be easily constructed to all varieties of loads and power level requirements.

It will be further appreciated that the described ballast circuit provides a relatively simple, cost-effective, highly reliable electronic ballast for gas discharge lamps without any restrictions on its power or starting and working voltage.

It will be further appreciated that the described ballast circuit provides an improved multivibrator-inverter circuit in which energy loss due to transistor common mode conduction is eliminated.

It will be further appreciated that the described ballast circuit provides an improved inverter circuit in which switching transistor feedback is employed to minimize the switching transistor energy loss during turn-off transition.

It will be further appreciated that the described ballast circuit provides an improved transistor switching circuit to minimize power dissipation as a result of turning on the transistor before its collector voltage has been reduced to its minimum level.

It will be further appreciated that the described ballast circuit provides an improved inverter circuit in which an efficient base drive circuit is provided to minimize power dissipation within each transistor while it is in conduction mode.

It will be further appreciated that the described ballast circuit provides two magnetically independent inductors resonating alternately with a tank capacitor. Such a combination has an effect on overall efficiency of the multivibrator-inverter circuit. In practical design, the RMS voltage across each inductor is half in value in comparison with the RMS voltage across the resonating capacitor. Smaller voltage across a ferromagnetic core inductor produces smaller flux density, which in effect appears as smaller core losses in the form of heat. In result, the inverter will operate with higher efficiency.

It will be further appreciated that the described ballast circuit provides an electronic multivibrating LC resonant inverter circuit which will stop operation without damage in case of overload or short circuit between its output terminals due to its foldback nature. The inverter circuit will cease its oscillations in case of an overload or will not be triggered to oscillate if there is a short circuit between any of its output terminals.

It is believed by this applicant that the present invention and its several advantages and features will be understood from the foregoing description. However, it will be apparent to a person skilled in the art that without departing from the spirit of the invention, changes may be made in its form and in the construction and interrelationships of it component parts, the forms herein presented merely representing presently preferred embodiments.

I claim:

1. Ballasting means for gas discharge lamps comprising: a source of relatively low frequency AC voltage; a DC voltage supply means powered from said source of AC voltage and operable to provide a unidirectional voltage between positive and negative terminals; a multivibrator-inverter connected with said pair of DC terminals and operable to provide a relatively high frequency sinewave AC voltage between a first inverter output terminal and a second inverter output terminal, said multivibrator-inverter having a plurality of magnetically independent LC resonant circuits and said multivrator-inverter being operable to periodically and in predetermined phase relation connect each of the magnetically independent LC resonant circuits means with said DC terminals; and output circuit means connected with said inverter output terminals and operable to connect with and to power said lamps, wherein said multivibrator-inverter means comprises: at least two power switching transistor means having respective bases, emitters and collectors; at least two magnetically independent LC resonant circuit means (i) in which the tank capacitor means is common for said LC resonant circuits, (ii) said LC resonant circuits being connected in predetermined phase relation with said voltage supply terminals by way of said switching transistor means, (iii) each tank inductor means of said LC resonant circuit means is connected in circuit with collector-emitter junction of said transistor means (iv) and said tank capacitor means is connected between collectors of the transistor means; feedback control means comprising secondary windings of said two magnetically independent resonant inductors, said secondary windings being connected to said transistor means and operable to provide intermittent current to effect periodic conduction of each of said switching transistor means in predetermined phase relation, and each said periodic conduction time period is dependent on the natural resonant frequency of said L-C resonant circuits respectively, and each of said conduction periods being initiated when the emitter-collector voltage of said switching transistor means is substantially zero in magnitude; and base current control means consisting of switching diode means connected in circuit with resistor means; and said current control means being connected between first terminals of said secondary windings and emitters of said transistor means, thereby operable to provide control of forward feedback base current and to terminate said forward feedback base current supplied to bases, and provide reverse feedback current to effectively turn-off said transistor means by force evacuation of charge carriers from base-emitter junction.

2. In an inverter circuit for providing an AC output voltage at AC voltage terminals from a source of DC voltage at DC voltage terminals and having at least first and second switching transistor means conducting in predetermined phase relation, the improvement comprising: at least two magnetically independent LC resonant circuit means consisting of: (i) at least two magnetically independent resonant inductors and one common resonant capacitor, (ii) said LC resonant circuit means being periodically connected between said AC voltage terminals and said DC voltage terminals in predetermined phase relation by way of said switching transistor means, (iii) said resonant inductors of said LC resonant circuit means connected in series with collector-emitter junctions of said first and second switching transistor means respectively, and (iv) said resonant capacitor connected between collectors of said switching transistor means; feedback control means comprising secondary windings of said two magnetically independent resonant inductors connected to bases of said switching transistor means and operable to provide intermittent current to effect periodic conduction of said switching transistor means in predetermined phase relation, and each said periodic conduction time period is related to the natural resonant frequency of said two LC resonant circuit means respectively, and each of said conduction periods being initiated when the emitter-collector voltage of said switching transistor means is substantially zero in magnitude, and said secondary windings connected to said transistor means in the following way: first terminals are interconnected together and second terminal of the secondary windings of the first resonant inductor is connected to base of the second switching transistor and second terminal of the secondary winding of the second resonant inductor is connected to base of the first switching transistor; and base current control means consisting of switching diode means connected in circuit with resistor means, and said current control means being connected between first terminals of said secondary windings and emitters of said transistor means, thereby operable to control forward feedback base current and to terminate said forward feedback current supplied to bases and provide reverse feedback current to effectively turn-off said transistor means by force evacuation of charge carriers from base-emitter junctions of said transistor means.

3. The inverter circuit of claim 2 wherein said secondary windings of said two magnetically independent resonant inductors providing said positive feedback signal are interconnected between the bases of the switching transistor means forming a low resistance path, the resistance of said low resistance path being no greater than the effective resistance of the base-emitter junctions for a given base drive configuration.

4. The inverter of claim 3 wherein output signal of said secondary windings of said resonant inductors causes termination of said positive feedback when said resonant capacitor becomes completely discharged and provides an effective short circuit between the bases of said switching transistor means, thereby providing negative potential to said bases of said switching transistor means.

5. The inverter circuit of claim 4 wherein said feedback control means magnetically coupled with said two magnetically independent LC resonant circuit means and said pair of switching transistor means self-oscillate.

6. In an inverter circuit containing a pair of alternately conducting first and second switching transistor means, each having a collector and base-emitter junction, and adapted to convert a unidirectional voltage into an alternating periodical sinusoidal voltage source, the improvement comprising: feedback control means connected to said transistors and operable to effect alternating periodic conduction thereof, said feedback control means supplying to the base-emitter junction of each transistor a control signal effective to turn on a transistor only after its collector voltage has dropped substantially to its lowest level prior to said control signals being supplied thereto and to turn off a transistor before its collector voltage has risen from its lowest level prior to said control signal being removed therefrom.

7. The inverter circuit of claim 6 wherein: said feedback control means is operable to turn off a transistor by reversing the control signal supplied to said base emitter-junction.

8. The inverter circuit of claim 6 wherein:
each said base-emitter junction has stored charge carriers while conducting; and
said feedback control means is effective to turn off a transistor by force evacuation of charge carriers from said base-emitter junction.

9. The inverter circuit of claim 6 wherein: said feedback control means consists of first and second secondary windings of first and second magnetically independent resonant inductors respectively, and said first secondary winding is magnetically tightly coupled with said first resonant inductor, and said second secondary winding is magnetically tightly coupled with said second resonant inductor; whereby said control signal is provided to said transistor bases to effect periodic conduction of each transistor dependent on the natural frequency of said two magnetically independent LC resonant circuits.

10. In an inverter circuit operable to convert a unidirectional voltage to an alternating voltage source and comprising:
first and second switching transistor means each having a first and second control terminal and a first and second switched terminal, said first and second switching transistor means being rendered conductive by application to said first and second control terminals of a positive voltage and rendered nonconductive by application to said first and second control terminals of a negative voltage, all respectively;
first and second magnetically independent LC resonant circuits consisting of first and second magnetically independent resonant inductors and one common resonant capacitor;
feedback control means consisting of secondary windings of said magnetically independent resonant inductors connected to said control terminals of said switching transistor means; and
base current control means consisting of switching diode means and resistor means.

11. The inverter circuit of claim 10 wherein: said feedback control means connected with said switching transistor means through base current control means and effective through positive feedback to provide intermittent feedback current to result in periodic conduction of said switching transistors thereby to cause sinusoidal voltage developed across said resonant capacitor means; magnitude of said sinusoidal voltage is independent of natural resonant frequency of said magnetically independent LC resonant circuits, and frequency of said sinusoidal voltage is dependent on natural resonant frequency of said first resonant inductor and said resonant capacitor in first half-cycle, and on natural resonant frequency of said second resonant inductor and said resonant capacitor in second half-cycle, and the magnitude of said sinusoidal voltage is twice the magnitude of the unidirectional voltage source.

12. The inverter of claim 10 wherein: said feedback control means function to render the inverter circuit self-oscillating.

13. The inverter of claim 10 wherein: said feedback control means function to stop the inverter oscillation in case of short circuit across said resonant capacitor or overload condition.

14. An inverter circuit adapted to provide an AC output voltage at an AC output and comprising: semiconductor switching means connected with a source of unidirectional voltage as well as with a tank circuit means, said switching means having control terminals and output terminals, said control terminals being provided with a signal operative periodically and alternatively to render said switching means in ON and OFF stages, said ON stage being characterized by ON-time, said OFF stage being characterized by OFF-time, said tank circuit means: (i) having two magnetically independent LC resonant tanks made of two magnetically independent inductors operable to alternately resonantly interact with one capacitor, (ii) each said tank having its own natural frequency, (iii) being operative to cause the AC output voltage to be sinusoidal in waveshape, and in magnitude independent of frequency, and (iv) each said tank being periodically connected in predetermined phase relation between said unidirectional voltage source and said AC output by means of said semiconductor switching means; and feedback control means consisting of tightly magnetically coupled secondary windings of said magnetically independent tank inductor means connected in circuit between said control terminals and operative: (i) to provide said signal in controlled manner, and (ii) by way of natural resonant energy transfer within each said resonant tank, to determine the duration of said ON-time.

15. An inverter circuit having:
first and second input terminals for receiving a DC input voltage therebetween;
first and second output terminals for producing an AC output voltage therebetween;
multivibrator means comprising:
first and second magnetically independent inductance means coupled respectively between the first input terminal and the first output terminal and between the second input terminal and the second output terminal;
capacitance means coupled between the first and second output terminals; and
first and second switch means coupled in series with respectively the first and second inductance means between the first input terminal and the first output terminal and between the second input terminal and the second output terminal, the first and second switch means being arranged to conduct periodically and in predetermined phase relation.

16. An inverter circuit according to claim 15 wherein the first and second switch means have control electrodes which are magnetically coupled to respectively the second and first inductance means.

17. An inverter circuit according to claim 15 further having additional inductance means coupled in series between the first input terminal and the first and second inductance means.

18. An inverter circuit according to claim 15 further having rectifier means and LC filter means coupled to the input terminals for supplying a DC voltage to said input terminals from a relatively low frequency AC voltage applied to said rectifier means and LC filter means, said LC filter means having a natural frequency substantially three times that of the low frequency AC voltage.

19. A ballast circuit for operating gas discharge lamps, the ballast circuit including an inverter circuit having:
first and second input terminals for receiving a DC input voltage therebetween;
first and second output terminals for producing an AC output voltage therebetween for operating the lamps;
multivibrator means comprising:
first and second magnetically independent inductance means coupled respectively between the first input terminal and the first output terminal and between the second input terminal and the second output terminal;
capacitance means coupled between the first and second output terminals; and
first and second switch means coupled in series with respectively the first and second inductance means between the first input terminal and the first output terminal and between the second input terminal and the second output terminal, the first and second switch means being arranged to conduct periodically and in predetermined phase relation.

* * * * *